United States Patent [19]

Hamilton, Jr.

[11] 4,350,140
[45] Sep. 21, 1982

[54] COOKING APPARATUS

[75] Inventor: Bert Hamilton, Jr., Oklahoma City, Okla.

[73] Assignee: Jet-It-Done, Inc., Oklahoma City, Okla.

[21] Appl. No.: 137,627

[22] Filed: Apr. 8, 1980

[51] Int. Cl.³ .............................................. F24C 1/16
[52] U.S. Cl. .................................. 126/276; 126/19.5; 126/391; 99/339
[58] Field of Search ...................... 126/268, 276, 19.5, 126/265, 254, 249, 253, 37 A, 37 B, 55, 39 N, 49, 51, 210, 391, 360 A; 312/236; 99/339

[56] References Cited

U.S. PATENT DOCUMENTS

| | | | |
|---|---|---|---|
| 1,331,241 | 2/1920 | Converse | 126/268 |
| 1,492,865 | 5/1924 | Strickland | 126/19.5 |
| 1,598,736 | 9/1926 | McDonald | 126/19.5 |
| 1,866,015 | 7/1932 | Davey | 126/19.5 |
| 2,205,160 | 6/1940 | Trackwell | 99/339 |
| 2,429,360 | 10/1947 | Kells | 126/391 |
| 2,817,331 | 12/1957 | Kaplan et al. | 99/339 |
| 3,060,922 | 10/1962 | Wilson | 126/391 |
| 3,307,528 | 3/1967 | Cook | 126/19.5 |
| 3,313,288 | 4/1967 | Aho | 126/391 |
| 3,447,529 | 6/1969 | Kump | 126/19.5 |
| 3,696,803 | 10/1972 | Holloway, Jr. | 126/276 |
| 3,970,072 | 7/1976 | Chipchase | 126/391 |
| 4,089,258 | 5/1978 | Berger | 99/339 |

Primary Examiner—Samuel Scott
Assistant Examiner—Randall L. Green
Attorney, Agent, or Firm—Christopher H. Morgan

[57] ABSTRACT

A cooking apparatus includes a frame having first and second side walls and having first and second end walls joining the first and second side walls. A first divider wall spans between the first and second side walls and divides the frame into first and second cooking zones. The first zone is particularly adapted for deep frying foods and the second zone is particularly adapted for grilling foods. A second divider wall spans between the first end wall and the first divider wall and divides the first cooking zone into first and second containers for holding a cooking liquid such as cooking oil. A first heat exchanger includes a first horizontally oriented tube portion located within the first container and extending through the first end wall and the first divider wall above a bottom of the first container. The first heat exchanger also includes a second horizontally oriented tube portion located in the second cooking zone below a grill thereof, with an open end of the second tube portion exiting through the second end wall. The interior of the second tube portion is connected to the interior of the first tube portion for fluid communication therebetween. Similarly, a second heat exchanger is disposed within the second container of the first cooking zone and within the second cooking zone.

31 Claims, 5 Drawing Figures

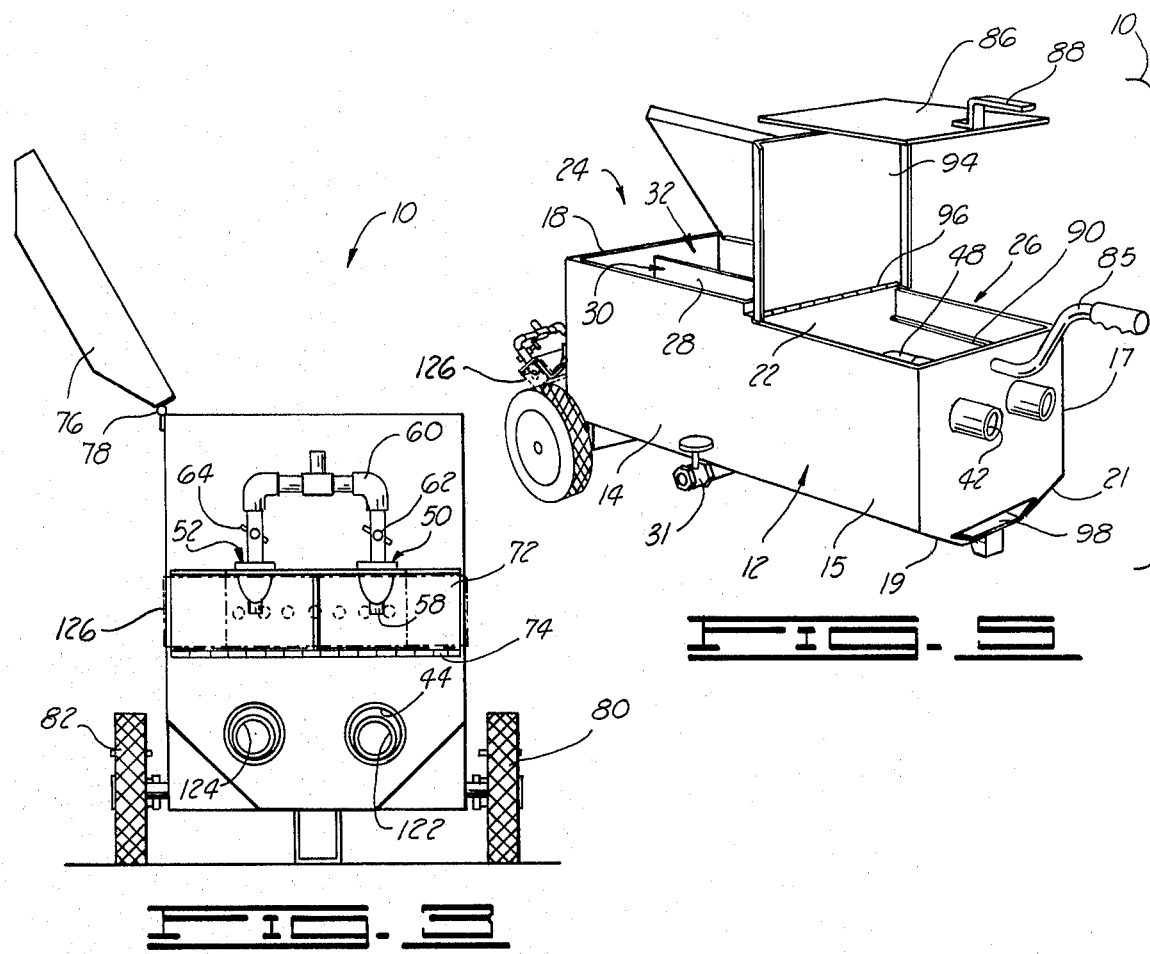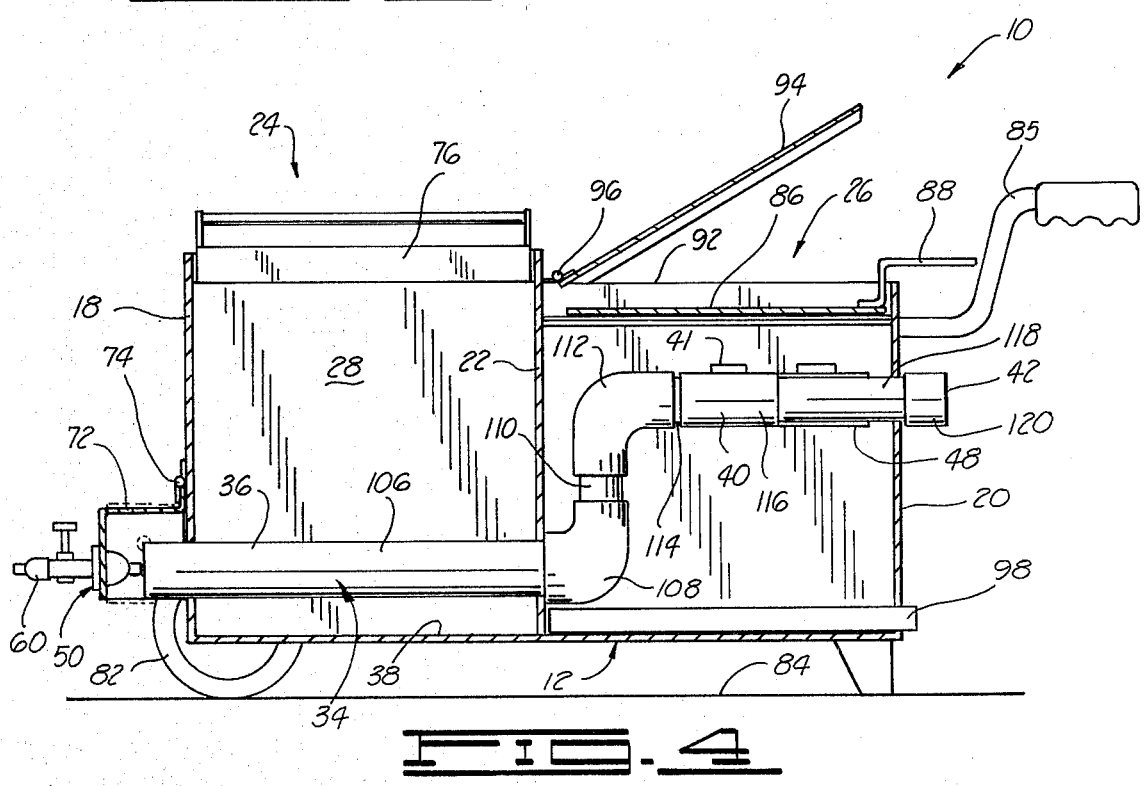

COOKING APPARATUS

BACKGROUND OF THE INVENTION

This invention relates generally to a cooking apparatus, and more particularly, but not by way of limitation, to a cooking apparatus providing means for simultaneously deep frying a first edible article and grilling a second edible article.

Prior art devices for deep frying foods have included heating elements usch as a gas burner located below a container within which cooking oil is located, so that the cooking oil is heated by the burner to deep fry the food. Also, the prior art includes grills having a heating element located below the grill for heating the grill so that an edible article placed upon the grill may be cooked. Typically, apparatus for deep frying foods and apparatus for grilling foods are not provided in an integral construction but rather are separate independent units.

It is often desirable to simultaneously deep fry one edible article, e.g., french fries, while grilling another edible article, e.g., hamburgers or steaks. Very often, this type of cooking is desirably done in an outdoor environment.

The present invention provides an integrally constructed portable cooling apparatus having both a deep frying unit and a grilling unit which receive heat from a common heat exchanger source. This provides a very convenient and economical apparatus for cooking the type of foods just described.

SUMMARY OF THE INVENTION

A cooking apparatus includes a frame having first and second side walls and having first and second end walls joining the first and second side walls. A first divider wall spans between the first and second side walls and divides the frame into first and second cooking zones. The first zone is particularly adapted for deep frying foods and the second zone is particularly adapted for grilling foods.

A second divider wall spans between the first end wall and the first divider wall and divides the first cooking zone into first and second container means for holding a cooking liquid such as cooking oil.

A first heat exchanger means includes a first horizontally oriented tube portion located within the first container means and extending through the first end wall and the first divider wall above a bottom of the first container means. The first heat exchanger means also includes a second horizontally oriented portion located in the second cooking zone below a grill thereof, with an open end of the second tube portion exiting through the second end wall. The interior of the second tube portion is connected to the interior of the first tube portion for fluid communication therebetween. Similarly, a second heat exchanger means is disposed within the second container means of the first cooking zone and within the second cooking zone.

First and second burner means are provided having first and second burner outlets, respectively, directed into inlets of the first tube portions of the first and second heat exchanger means, respectively, for directing jets of flame into the inlets of said first tube portions so that streams of hot gases are directed through said interiors of said tube portions of said first and second heat exchanger means.

The hot gases flowing through the heat exchanger means transfer heat to the cooking oil in the first and second container means of the first cooking zone, and by radiation and convection transfer heat to the grill in the second cooking zone.

It is therefore a general object of the present invention to provide an improved cooking apparatus.

A further object of the present invention is to provide a deep frying cooking apparatus having a heat exchanger means submerged within the cooking oil.

Another object of the present invention is the provision of a cooking apparatus having means for simultaneously deep frying a first edible article and grilling a second edible article, through the use of a single heat exchanger transferring heat to both said first and second edible articles.

Other and further objects, features and advantages of the present invention will be readily apparent to those skilled in the art upon a reading of the description of preferred embodiments which follows when taken in conjunction with the accompanying drawings.

BRIEF DESCRIPTION OF THE DRAWINGS

FIG. 3 is a rear end view of the cooking apparatus of FIG. 1 with the burner means rotated 90° upward to their transport position, and with the lid on the first cooking zone rotated to an open position.

FIG. 4 is a sectional elevation view taken about line 4—4 of FIG. 2, and shows the lid of the first cooking zone in place and the lid of the second cooking zone partially open with the grill in place thereunder.

FIG. 5 is a perspective exploded view of the cooking apparatus of FIG. 1 showing the lids over the first and second cooking zones in their open positions and showing the grill from the second cooking zone elevated above the second cooking zone.

DETAILED DESCRIPTION OF THE PREFERRED EMBODIMENTS OF THE INVENTION

Figure 1:
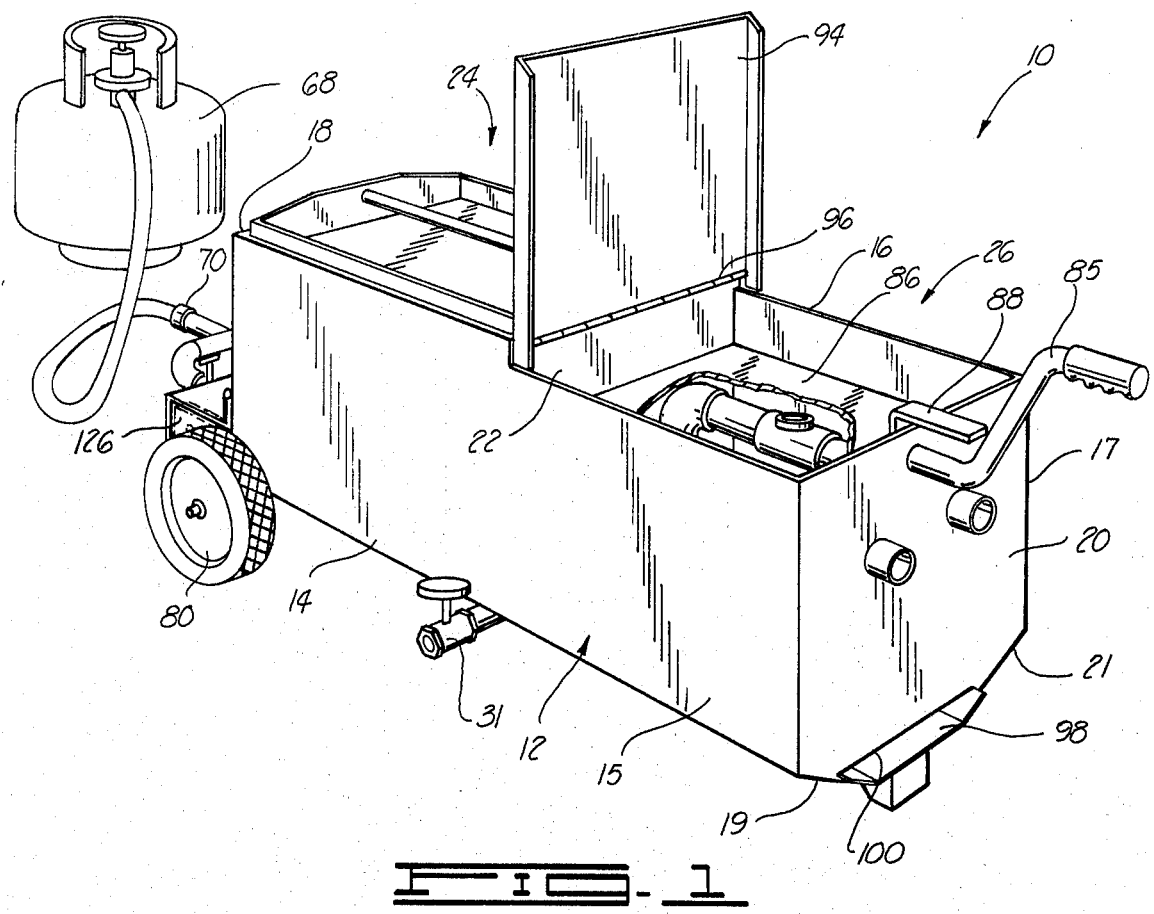
FIG. 1 is a perspective view of the cooking apparatus of the present invention showing a lid in place on the first cooking zone, a lid opened above the second cooking zone, and a portion of the grill of the second cooking zone cut away so that the second heat exchanger means may be seen therebelow.

Referring now to the drawings and particularly to FIG. 1, the cooking apparatus of the present invention is shown and generally designated by the numeral 10.

The cooking apparatus 10 includes a frame 12 having first and second side walls 14 and 16, and having first and second end walls 18 and 20 joining said first and second side walls 14 and 16 at their ends. First side wall 14 includes a vertical upper portion 15, and an inwardly sloped lowered portion 19. Second side wall 16 includes a vertical upper portion 17 and an inwardly sloped lower portion 21.

A first divider wall 22 spans between first and second side walls 14 and 16 and divides the frame 12 into first and second cooking zones generally designated by the numerals 24 and 26.

A second divider wall 28 spans between first end wall 18 and first divider wall 22 and divides first cooking zone 24 into first and second container means 30 and 32, respectively, for holding a cooking liquid such as cooking oil or the like. Drain valves 31 and 33 are provided for draining cooking oil from container means 30 and 32, respectively.

Figure 2:
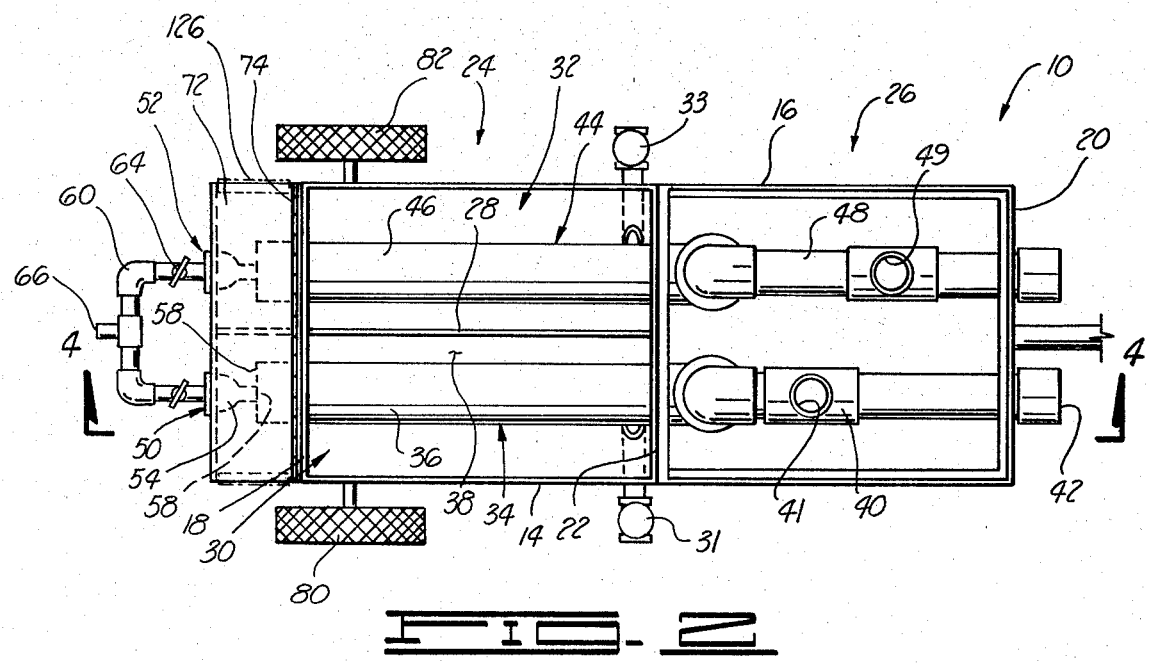
FIG. 2 is a plan view of the cooking apparatus of FIG. 1. with the lids and grill removed so that the interior components may be more clearly shown.

Referring now to FIGS. 2 and 4, a first heat exchanger means 34 has a first horizontally oriented cylindrical tube portion 36 located within first container means 30 and extending through first end wall 18 and first divider wall 22 above a bottom 38 of first cooking zone 24. The bottom 38 may also be described as a bottom of either of the first and second container means 30 and 32. When first container means 30 is filled with cooking oil the upper level of the oil is above the tubular portion 36 so that tubular portion 36 is submerged in cooking oil.

First heat exchanger means 34 includes a second horizontally oriented cylindrical tube portion 40 located within second cooking zone 26. Second tube portion 40 has an upwardly directed opening 41. An open end 42 of second tube portion 40 exits through second end wall 20 of the frame 12. An interior of the second tube portion 40 is connected to an interior 44 (see FIG. 3) of first tube portion 36 for fluid communication therebetween.

Similarly, a second heat exchanger means 44 has a first horizontally oriented tubular portion 46 located within second container means 32 and has a second horizontally oriented tubular portion 48 located within second cooking zone 26. Second tube portion 48 has an upwardly directed opening 49.

First and second heater means 50 and 52 are provided for heating a fluid to flow through the interiors of the tube portions of the first and second heat exchanger means 34 and 44, respectively.

First heater means 50 includes a first burner means 54 having a burner outlet 56 directed into an inlet 58 of first tube portion 36 of first heat exchanger means 34. The burner means 54 directs a jet of flame into the inlet 58 so that a stream of hot gases is directed through the interior of first tube portion 36 and then through the interior of second tube portion 40 of first heat exchanger means 34. Heat is then transferred from these hot gases, which may be described as a hotter fluid relative to the cooking fluid, to the first and second cooking zones 24 and 26.

Those hot gases are exhausted to atmosphere at the downstream end 42 of second tubular portion 40.

The second heater means 52 is similarly constructed to the first heater means 50.

First and second heater means 50 and 52 are each connected to a common inlet manifold 60. Inlet manifold 60 includes first and second control valves 62 and 64 for controlling the amount of fuel flowing to first and second heaters 50 and 52, respectively. Manifold 60 includes an inlet 66 for attachment to a fuel supply 68 (see FIG. 1) by means of a quick connect type hose coupling 70.

The first and second heater means 50 and 52 are mounted upon a heater support bracket 72, best shown in FIG. 4, which bracket is pivotally attached to frame 12 at hinge 74.

The heaters and the heater support bracket 72 are shown in FIGS. 1, 2 and 4 in the downward position with the heaters oriented for directing flame into the first and second heat exchangers 34 and 44 when the cooking apparatus 10 is being used to cook food.

The heater support bracket 72 may be rotated approximately 90° clockwise about hinge 74 as seen in FIG. 4, to a transport position as shown in FIG. 3, wherein the burner outlets such as outlet 56 are not directed into the inlets of the heat exchanger means such as inlet 58. The arrangement shown in FIG. 3 provides a more convenient positioning of the heaters for transport and storage of the device.

The first container means 30 may therefore be generally described as having first and second perpendicularly oriented pairs of opposed side walls, a bottom, and an open top for permitting placement of an edible article into the container means 30. The first pair of opposed side walls for the first container means 30 is comprised of second divider wall 28 and first side wall 14 of frame 12. The second pair of opposed side walls for first container means 30 is comprised of first end wall 18 and first divider wall 22.

The first horizontally oriented cylindrical tube portion 36 of first heat exchanger means 34 is oriented parallel to the first pair of opposed side walls of container means 30, i.e. parallel to first side wall 14 and second divider wall 28, and is disposed through each of said second pair of opposed side walls, i.e. first end wall 18 and first divider wall 22, above the bottom 38 of first container means 30.

The second container means 32 may generally be described as being located adjacent first container means 30, said first and second container means 30 and 32 being separated by a common wall, i.e. second divider wall 28, therebetween.

A first lid means 76 is provided for covering the open tops of first and second container means 30 and 32. First lid means 76 is pivotally attached to second side wall 16 of frame 12 at hinge 78. Lid means 76 comprises a single structural member covering both said first and second container means 30 and 32 when in the closed position as illustrated in FIG. 1.

A pair of ground engaging wheels 80 and 82 are attached to frame 12 for permitting the cooking apparatus 10 to be rolled across a ground surface 84 (see FIG. 4). A handle 85 is attached to frame 12 for pulling the apparatus 10.

Located within second cooking zone 26 is a flat plate grill 86 having a handle 88 attached thereto. The grill 86, when in place within said second cooking zone 26, rests upon a support bracket 90 located a distance below a top 92 of first cooking zone 26 as is best seen in FIG. 4. The grill 86 may generally be referred to as a cooking surface 86. The grill 86 is located above the second horizontally oriented tube portions 40 and 48 of first and second heat exchanger means 34 and 44, respectively.

Flat plate grill 86 may be replaced by an open mesh type grill (not shown) comprised of a plurality of crisscrossed bars. With an open mesh grill it is desirable to provide a bed of permanent charcoal type rocks or similar material below the grill to distribute heat from the heat exchanger more evenly below the grill.

A second lid means 94 is pivotally attached to frame 12 above second cooking zone 26 at hinge 96.

A grease pan 98, which may be generally described as a removable grease catching means 98, is located below the second tubular portions 40 and 48 of first and second heat exchanger means 34 and 44 for collecting grease from the edible articles being cooked upon the grill 86. The grease catching tray or pan 98 is disposed within an opening 100 in second end wall 20 of frame 12. Opening 100 is defined partially by the sloped lower portions 19 and 21 of first and second side walls 14 and 16 of frame 12.

First heat exchanger means 34 is preferably constructed in the following manner, with reference being made particularly to FIG. 4. The first horizontally oriented tubular portion 36 of first heat exchanger means 34 is preferably constructed from a length of two inch nominal diameter steel pipe 106. The forward end of pipe 106 is attached to a two inch by one and one-half inch reducing ell 108. The one and one-half inch end of ell 108 is directed upward and connected to a one and one-half inch nominal diameter pipe nipple 110, the other end of which is attached to a one and one-half inch 90° ell 112.

The other end of ell 112 is connected to a one and one-half inch nominal diameter pipe nipple 114 the other end of which is attached to a one and on-half inch tee 116 the middle leg of which defines the upward directed opening 41 previously identified with respect to FIG. 2.

The other end of tee 116 is attached to a longer one and one-half inch nominal diameter pipe nipple 118 which extends through second end wall 20 of frame 12 and has attached to the outer end thereof a one and one-half inch pipe coupling 120.

All of the components of second heat exchanger means 34 are preferably painted black for maximum heat transfer efficiency. Second heat exchanger means 44 is similarly constructed.

First and second heat reducers 122 and 124 are located within first tubular portions 36 and 46 of first and second heat exchanger means 34 and 44, respectively. Heat reducers 122 and 124 each comprise a length of one and one-half inch nominal diameter pipe. The heat reducers 122 and 124 each provide a means for reducing the proportion of heat transferred to first cooking zone 24 and increasing the proportion of heat transferred to second cooking zone 26.

It will be understood by those skilled in the art that by directing the heaters into the heat reducers 122 and 124 the heat transferred from the first tubular portions of heat exchanger means 34 and 44 will be reduced due to the insulating effect of the heat reducers 122 and 124 and the space between the heat reducers and the first tubular portions of the heat exchangers.

When only the first cooking zone 24 is being utilized the heat reducers 122 and 124 should be removed. When the second cooking zone 26 is being used to grill foods the heat reducers 122 and 124 should be in place.

When the cooking apparatus 10 is used outdoors in a strong wind a shield 126 is disposed about heater support bracket 72 to prevent the heaters 50 and 52 from blowing out. Shield 126, shown in phantom line in FIGS. 1, 2, 3 and 5, extends over the openings beneath and on the sides of bracket 72. Shield 126 is slidably received over bracket 72 and can slide rearwardly to allow the heaters 50 and 52 to be lighted. When bracket 72 is lowered, shield 126 encloses heaters 50 and 52. Holes are provided in the lower and side walls of shield 126 to allow the proper amount of air to draw through the holes for combustion of the heater gases.

The manner of operation of the cooking apparatus 10 of the present invention is generally as follows. The first and second container means 30 and 32 are filled with cooking oil. The fuel supply 68 is connected to the inlet manifold 60. The first and second heaters 50 and 52 are lighted and the flame and hot gases drawn thereby are directed into first and second heat exchanger means 34 and 44. The hot gases flowing through the first tubular portions 36 and 46 of first and second heat exchanger means 34 and 44 transfer heat to the cooking oil in first and second container means 30 and 32 to heat the same.

A conventional cooking thermometer (not shown) should be maintained in contact with the cooking oil in each of the container means 30 and 32 at all times, and when the cooking oil reaches approximately 300° the flame from heaters 50 and 52 should be turned back to maintain the temperature of the cooking oil at approximately 300°. Conventional wire mesh baskets (not shown) are then used to place the food within first and second container means 30 and 32 so that it may be deep fried therein and then removed therefrom.

If it is desired to also grill food upon the grill 86 simultaneously with the deep frying operation, the heat reducers 122 and 124 should be placed within the first horizontally oriented tubular portions 36 and 46 of the first and second heat exchanger means 34 and 44 to decrease the amount of heat transferred to the cooking oil in the first tubular portions and to increase the relative amount of heat transferred to the grill 86 from the second tubular portion 40 and 48. The heat reducers 122 and 124 are not absolutely necessary but their use is preferable.

By the proper use of the cooking apparatus 10 foods may be simultaneously deep fried and grilled within the first and second cooking zones 24 and 26 in an economical and convenient manner.

Thus, it is seen that the cooking apparatus 10 of the present invention readily achieves ends and advantages mentioned as well as those inherent therein. While presently preferred embodiments of the invention have been described for the purpose of this disclosure, numerous changes in the arrangement and construction of parts may be made by those skilled in the art which changes are encompassed within the spirit and scope of this invention as defined by the appended claims.

What is claimed is:

1. A cooking apparatus comprising:
container means for holding a cooking liquid;
a cooking surface disposed adjacent said container means;
heat exchanger means for transferring heat to both said cooking liquid in said container means to cook an edible article and said cooking surface to cook a second edible article, said heat exchanger means including at least one tube means extending through said container means for conveying heated gases therethrough and beneath said cooking surface for conveying heated gases thereto, a portion of said heated gases to contact said cooking surface through an opening in said tube means disposed beneath said cooking surface; and
burner means, having a burner outlet directed into an inlet of said tube for directing a jet of flame into said inlet of said tube means and heating gases conveyed through said tube means, through said container means and beneath said cooking surface through said opening.

2. The apparatus of claim 1, wherein:
said tube means includes a cylindrical tube.

3. The apparatus of claim 1, wherein:
said burner means is pivotally connected to said container means so that said burner means may be pivoted, relative to said container means, to a transport position wherein said burner outlet is not directed into said inlet of said tube means.

4. The apparatus of claim 1, further comprising:

coupling means for attaching a fuel inlet of said burner means to a source of fuel.

5. The apparatus of claim 1, wherein:
said container means is further characterized as having first and second perpendicularly oriented pairs of opposed side walls, a bottom, and open top for permitting placement of said edible article into said container means; and
said tube means is oriented parallel to said first pair of opposed side walls of said container means and is disposed through each wall of said second pair of opposed side walls above said bottom of said container means.

6. The apparatus of claim 5, wherein:
said tube means is further characterized as being a cylindrical tube.

7. The apparatus of claim 1, further comprising:
a second container means for holding a second cooking liquid separate from said first cooking liquid located adjacent said first container means, said first and second container means being separated by a common wall therebetween.

8. The apparatus of claim 7, further comprising:
lid means for covering open tops of said first and second container means.

9. The apparatus of claim 8, wherein:
said lid means is pivotally attached to a side wall of one of said first and second container means, said lid means including a single structural member covering both of said first and second container means.

10. The apparatus of claim 1, further comprising:
ground engaging wheel means connected to said container means for permitting said cooking apparatus to be rolled across a ground surface.

11. The apparatus of claim 1, further comprising:
heat reducer means, located within said tube means within said container means for decreasing a proportion of heat transferred to cooking liquid in said container means and for increasing a proportion of heat transferred to said cooking surface.

12. The apparatus of claim 11, wherein:
said heat reducer means includes a cylindrical tube disposed within said tube means.

13. The apparatus of claim 1, wherein:
said burner outlet is directed into an inlet of said tube means adjacent said container means so that said heated gases flow first through said container means and then beneath said cooking surface.

14. The apparatus of claim 13, further comprising:
heat reducer means, located within said tube means, for decreasing a proportion of heat transferred to cooking liquid in said container means and for increasing a proportion of heat transferred to said cooking surface.

15. The apparatus of claim 14, wherein:
said heat reducer means includes a cylindrical heat reducer tube disposed within said tube means and arranged so that said burner outlet is directed into an inlet of said cylindrical heat reducer tube.

16. The apparatus of claim 1, further comprising:
removable grease catching means, located below said tube means for collecting grease from said second edible article as said second edible article is cooked on said cooking surface.

17. The apparatus of claim 16, further comprising:
frame means for holding said cooking surface and said tube means, said frame means having two opposed sides having vertical upper portions and inwardly sloped lower portions joined by a flat bottom and having an end wall joining said sides and bottom, said end wall having an opening therein defined partially by said sloped lower portions of said sides; and
wherein said removable grease catching means includes a tray received within said opening in said end wall.

18. The apparatus of claim 1, further comprising:
frame means for holding said cooking surface and said tube means.

19. The apparatus of claim 18, further comprising:
ground engaging wheel means for supporting said frame means from a ground surface so that said cooking apparatus may be rolled across said ground surface.

20. The apparatus of claim 18, further comprising:
lid means, pivotally attached to said frame means, for covering said cooking surface.

21. The apparatus of claim 18, wherein:
said cooking surface is further characterized as being a removable cooking surface.

22. A cooking apparatus comprising:
a frame having first and second side walls and having first and second end walls joining said first and second side walls;
a first divider wall spanning between said first and second side walls and dividing said frame into first and second cooking zones;
a cooking surface disposed in said second cooking zone;
a second divider wall and a bottom wall spanning between said first end and said first divider wall and dividing said first cooking zone into first and second container means for holding a cooking liquid;
a first heat exchanger means, having a first horizontally oriented tube portion located within said first container means and extending through said first end wall and said first divider wall above a bottom of said first container means, and having a second horizontally oriented tube portion located in said second cooking zone with an open end of said second tube portion exiting through said second end wall and with an upwardly directed opening in said second tube portion disposed in said second cooking zone beneath said cooking surface, said second tube portion having an interior connected to an interior of said first tube portion for fluid communication therebetween;
a second heat exchanger means, having a first horizontally oriented tube portion located within said second container means and extending through said first end wall and said first divider wall above a bottom of said first container means, and having a second horizontally oriented tube portion located in said second cooking zone with an open end of said second tube portion exiting through said second end wall and with an upwardly directed opening in said second tube portion disposed in said second cooking zone beneath said cooking surface, said second tube portion having an interior connected to an interior of said first tube portion for fluid communication therebetween;
first heater means for heating a fluid to flow through said interiors of said tube portions of said first heat exchanger means; and second heater means for heating a fluid to flow through said interiors of said tube portions of said second heat exchanger means.

23. The apparatus of claim 22, wherein:
said first and second heater means include first and second burner means, having first and second burner outlets directed into inlets of said first tube portions of said first and second heat exchanger means, respectively, for directing jets of flame into said inlets of said first tube portions so that a stream of hot gases is directed through said interiors of said tube portions of said first and second heat exchanger means.

24. The apparatus of claim 23, wherein:
said first and second burner means have a common inlet manifold means for supplying fuel to said first and second burner means.

25. The apparatus of claim 24, wherein:
said first and second burner means and said common inlet manifold means are pivotally connected to said frame so that they may be pivoted, relative to said frame, to a transport position wherein said burner outlets are not directed into said inlets of said first tube portions of said first and second heat exchanger means.

26. The apparatus of claim 23, further comprising:
removable heat reducer means for decreasing a proportion of heat transferred from said first and second heat exchanger means to said first cooking zone and for increasing a proportion of heat transferred from said first and second heat exchanger means to said second cooking zone.

27. The apparatus of claim 26, wherein:
said heat reducer means includes a cylindrical heat reducer tube located within said first tube portions of each of said first and second heat exchanger means, respectively, said first and second burner outlets being directed into inlets of said cylindrical heat reducer tubes, respectively.

28. The apparatus of claim 27, wherein:
said first tube portions of said first and second heat exchanger means are each further characterized as being cylindrical tube portions.

29. The apparatus of claim 22, further comprising:
ground engaging wheel means attached to said frame for allowing said frame to traverse a ground surface; and
handle means attached to said frame so that said frame may be pulled across said ground surface by pulling on said handle.

30. The apparatus of claim 22, further comprising:
removable heat reducer means for decreasing a proportion of heat transferred from said first and second heat exchanger means to said first cooking zone and for increasing a proportion of heat transferred from said first and second heat exchanger means to said second cooking zone.

31. The apparatus of claim 30, wherein:
said heat reducer means includes a heat reducer tube located within said first tube portions of each of said first and second heat exchanger means, respectively.

* * * * *